Patented Oct. 27, 1925.

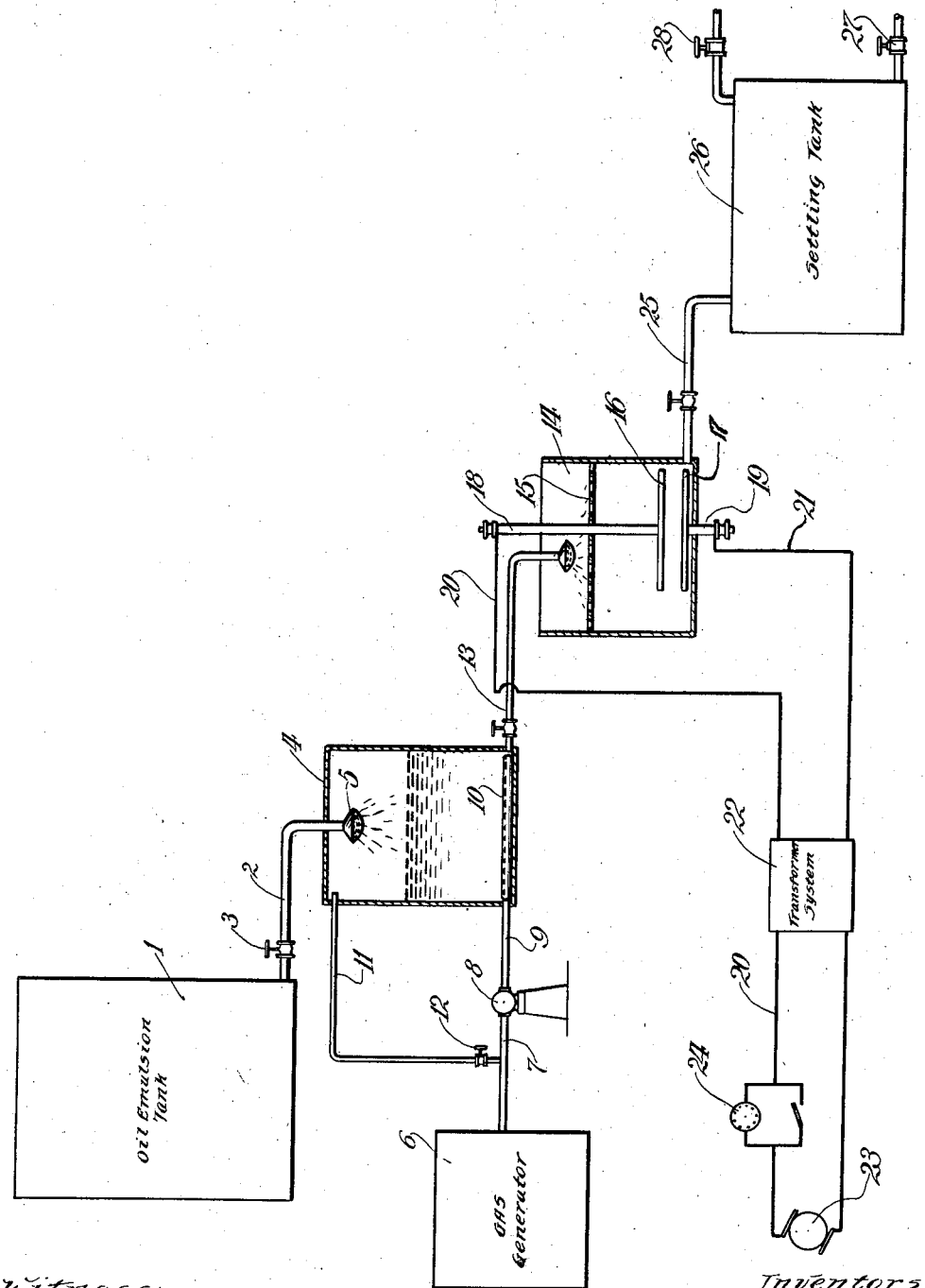

1,559,036

UNITED STATES PATENT OFFICE.

GUSTAV EGLOFF AND JACQUE C. MORRELL, OF CHICAGO, ILLINOIS, ASSIGNORS TO UNIVERSAL OIL PRODUCTS COMPANY, OF CHICAGO, ILLINOIS, A CORPORATION OF SOUTH DAKOTA.

PROCESS AND APPARATUS FOR DEHYDRATION OF OIL.

Application filed February 18, 1922, Serial No. 537,483. Renewed March 28, 1925.

*To all whom it may concern:*

Be it known that we, GUSTAV EGLOFF and JACQUE C. MORRELL, both citizens of the United States, and residing in the city of Chicago, county of Cook, and State of Illinois, have invented certain new and useful Improvements in Processes and Apparatus for Dehydration of Oil, of which the following is a specification.

This invention relates to improvements in a process and apparatus for dehydration of oil and refers more particularly to the breaking up of oil and water emulsions whether the oil be in the continuous or dispersed phase of the emulsion.

Among the important objects of the invention are to provide a process in which the oil is introduced in a dispersed condition to a zone of treatment wherein gas is injected and subsequent thereto passed through a stage of electrical treatment; thence to a settling stage where the oil and water are permitted to separate.

The single figure is a diagrammatic side elevational view of the apparatus with parts in section. In general there are two methods for breaking emulsions; first the destroying of the emulsifying agent which may be done either by physical or chemical means; second, the disruption of the emulsion by electrical stresses. The first method is particularly adapted to emulsions in which water is in the continuous phase, while the second method has proven to be somewhat more successful in breaking emulsions in which the oil is in the dispersed phase. With regard to the latter method, owing to the dielectric constants of the components of the system and the resistance offered to the passage of the current, very high potential differences are necessary for effective work.

In the present invention, to make such emulsions more susceptible to treatment, there is added a substance which will effect the interfacial film between the oil and water. Such substance must necessarily be of such a nature as to increase the conductivity of the system and thus decrease the resistance, allowing the use of the lower potentials or increasing the effective work of high potentials. Such substances generally have the characteristics of an electrolyte capable of conducting the electric current when dissolved in the components of the emulsion. This electrolyte substance may be a gas, a solid or liquid, and of a basic acid or neutral substance. In cases where it is difficult or impossible to introduce solid or liquid substances owing to the oil wetting the substances preferentially, thus preventing contact with the acid solution of the water in the system, a condition which exists if the oil is in the continuous phase and greatly in excess, it is convenient to use gaseous substances which are soluble both in the oil and water.

Even though the oil does not act as an ionizing medium, there would be formed what is equivalent to layers of conducting and non-conducting media which would be equivalent to cutting down to a great extent the thickness of the system, thus allowing more effective work with thin layers of the treatment of thicker layers, in this way increasing the capacity and cutting down costs. It is also important that the electrolyte may be selected to have a specific effect on the interfacial film which would allow the treatment of heretofore unbreakable emulsions. The type of gas selected would depend on the nature of the emulsion and the character and amount of oil and water contained in the emulsion combination. As examples of gases which might be used, ammonia, sulphur dioxide, hydrogen, chloride, chlorine and carbon dioxide may be mentioned. These gases are all more or less soluble in the oil phase, and in the water phase form compounds which ionize to give conducting particles. For example, sulphur dioxide would form sulphurous acid giving the hydrogen and sulphite ions.

In operation the oil emulsion to be treated is introduced to the feed tank 1. It flows down through the pipe 2 controlled by a valve 3 and is sprayed into a mixing tank 4 through the spray 5. Gas supplied from a generator 6 is charged therefrom through the pipe 7, pump 8 and discharge line 9 into a perforated rose or spray pipe 10 positioned in the bottom of the mixing tank 4. The oil emulsion is maintained at a level in the mixing tank and the gas injected through the body of the oil. The gas is drawn off from the top of the oil through the line 11 controlled by a valve 12 and is recycled through the mixing tank.

The bubbling up of the gas through the oil facilitates the oil gas solution. The excess or undissolved gas above the liquid further meets a spray of the emulsion and due to the dispersed character of the latter a greater quantity of gas is disrupted in the oil body. The oil gas solution is drawn off through a line 13 and run into the electrode tank 14 where it is sprayed onto a perforated plate 15. In the electrode tank are positioned electrodes 16 and 17 connected by means of binding posts 18 and 19 and wires 20 and 21, to the transformer 22 which is supplied with power from any electrical generator or other source of current 23. A make and break switch 24 is interposed in wire 20. The difference in potential between the electrodes may be varied according to the nature of the oil treated and the amount of water present. Variations between 500 to 30,000 volts may be used for complete separation. The transformer has a make and break switch arrangement 24 described, for a continuous or intermittent flow of current. The oil having the gas in solution percolates through the perforated plate and is subjected to the action of the arc between the two electrodes 16 and 17. Here the emulsion is completely disrupted, the oil and water flowing in a separate state through the line 25 to the settling tank 26 from which the water is drawn off through the valve 27, and the oil taken off at the bottom through the valve 28. The process is continuous and the separated liquids run into the settling tank where a gravity separation is effected. In the settling tank the oil may be subjected to a solution of an acid base or salt. Waste substances such as brine liquors, sulphuric acids from the treatment of oils and water, and caustic soda solutions may be utilized in this final refining stage or settling tank for purifying the separated oil.

We claim as our invention:

1. A process for dehydrating oil, consisting in dissolving into the oil and water a medium adapted to improve its conductivity, then passing an electric current therethrough to effect separation and permitting the water to separate from the oil in a settling stage.

2. A process for separating an oil and water emulsion, consisting in dissolving into the emulsion a medium adapted to improve its conductivity, subjecting the emulsion solution to an electrical current passing between electrodes of different potential and permitting the separated oil and water to separate in a settling stage.

3. A process for separating oil from an oil and water emulsion, consisting in dissolving into the emulsion a medium adapted to improve its conductivity, subjecting the emulsion solution to an electrical current produced between electrodes of different potential, passing the separated constituents to a settling stage.

4. A process for separating oil from an oil water emulsion, consisting in dissolving into the emulsion a medium adapted to improve its conductivity, and subjecting the emulsion solution to an intermittent current produced between electrodes of different potential, passing the separated oil and water constituents to a settling stage and there subjecting them to a chemical reaction for eliminating chemical impurities.

GUSTAV EGLOFF.
JACQUE C. MORRELL.